July 26, 1949.   J. A. SAFFIR   2,477,268
COMPOSITIONS FOR MOLDING DENTURES
AND DENTURES MOLDED THEREFROM
Filed Oct. 2, 1944   2 Sheets-Sheet 1

Inventor
JACOB A. SAFFIR,
By Bennett H. Levenson.
Attorney

UNITED STATES PATENT OFFICE 2,477,268

COMPOSITIONS FOR MOLDING DENTURES AND DENTURES MOLDED THEREFROM

Jacob A. Saffir, Kew Gardens, N. Y., assignor to The Dentists' Supply Company of New York, New York, N. Y., a corporation of New York Application October 2, 1944, Serial No. 556,830

15 Claims. (Cl. 32—2)

This invention relates to the art of resins and their adaptations. More particularly it pertains to an improvement in resin compositions and especially to articles derived from a preferred class of resins or compositions containing them. In its optimum application the invention is concerned with the art of dental prosthesis, embracing among its features novelty of composition and article.

In the art of fabricating articles of resinous derivation, among the factors which frequently merit consideration is that of attaining such properties as maximum strength, improved wearing qualities and resistance to abrasion, a high degree of resistance to breakage and a substantial inertness to various chemical reagents and solvents.

Efforts for attaining such characteristics have involved reinforcing expedients, exemplified by the resort to production of laminated articles comprising a resin and another material, such as glass cloth. Such articles have embraced a high proportion of the reinforcing material relative to the resin content. While articles of this type have proven practicable in certain fields of endeavor, they are of comparatively little value in other arts, such as that of dental prosthesis.

The requirements in the denture art relative to the characteristics of materials utilized in their fabrication are quite well defined. Illustrative of the desired attributes are substantial strength, resistance to abrasion and wear generally and such other characteristics as being tasteless, odorless, translucent and/or amenable to appropriate coloration or shading to permit the simulation of natural teeth or the like, as well as adaptability to afford a satisfactory aesthetic value. Despite the fact that dentures are attainable that are commercially practicable, it is generally conceded that there are many shortcomings which prevail. By the term "denture" or its equivalent, it is intended to generically embrace the various types of dental elements either individually or in combination including dental bases, artificial teeth, crowns of diverse types, bridges, dental facings and any other dental parts within the purview of the term as it is interpreted in the art. Similarly the expression "at least partially polymerized" is intended to include within its scope completely polymerized materials including compounds or monomers of the type herein disclosed as well as any extent of partial polymerization of such materials.

While the commonly utilized materials have provided expedient service, their shortcomings have been recognized. For example, the resinous dentures of acrylic derivation such as methyl methacrylate are susceptible to water or fluid absorption in undesirable measure, particularly at temperatures approximating the boiling point of water, and they are accordingly not amenable to sterilization at such temperatures.

Insufficient hardness, lack of abrasive resistance, and solubility or sensitivity of fluids of the type which may occur in the oral cavity, as well as other causes of warpage may also be experienced with this type of resin. The cohesive tendency of the acrylate resins to such substances as gum has similarly been a source of objection.

In the case of the so-called vinyl resin dentures, these are, on the whole, susceptible to excessive fluid absorption for denture purposes and other causes of warpage, including a substantial coefficient of shrinkage during molding; in addition, they may show an undesirable degree of brittleness and other of the properties of the methyl methacrylate denture which are not particularly adapted for the purpose contemplated.

As for plastic dentures of the vulcanite type, they generally do not lend themselves to aesthetic shading or coloration and are essentially opaque. Moreover, this material tends to absorb fluids in the oral cavity to the extent that fouling or objectionable odors may develop in the superficial stratum due to fermentation or decay; this, together with a low Brinell hardness and insufficient resistance to abrasion, in effect precludes the utilization of vulcanite in the manufacture of artificial teeth and emphasizes the desirability of an improvement in the art.

It is an object of my invention to obviate such difficulties and uncertainties as hereinabove described.

Another object is to provide an improvement in synthetic resinous substances, more particularly such as are effective in the art of dental prosthesis.

An added object is the production of internally reinforced resinous compositions affording novel physical attributes and generally increased inertness to chemical reagents.

An additional object is the obtention of a resinous composition manifesting improved chemical and physical properties of the type preferred for denture fabrication, and which lends itself to the production of articles of improved aesthetic value.

An important object is to attain dentures, including the denture plate and/or teeth, which are especially efficacious, embodying enhanced strength and toughness, wear and abrasive resistant properties, inertness to conditions and chemicals encountered in the oral cavity and of desirable aesthetic appearance.

A further object is the provision of suitably aesthetic dentures comprising the plate and/or artificial teeth which are of a diallyl resin derivation, desirably resistant to wear and abrasion, and substantially inert to chemical reagents or physical conditions which may prevail in the oral cavity.

A significant object of the invention is an article adapted for dental prosthesis, embracing the plate and/or artificial teeth, which is fabricated from a reinforced diallyl resin, and affording substantially reduced brittleness, increased toughness and general strength, and requisite chemical and physical inertness under conditions which may be encountered in the oral cavity.

A particularly expedient object is a denture comprising a plate and/or artificial teeth made from a diallyl resin, which is a linear chain type organic ester having two terminal allyl radicals.

A special object of the invention is the production of a denture including the plate and/or artificial teeth from a linear chain type organic ester having two terminal allyl radicals, which ester has been reinforced by discrete glass fibers.

A further object is to devise a method for making synthetic resinous materials and dentures comprising plates and/or teeth from resins of the aforementioned type and composition, whereby the articles obtained manifest improved chemical and physical properties that are attributes in the art of dental prosthesis.

Other objects, advantages and features of my invention will become apparent from the following description read in connection with the drawings in which similar elements are designated by like numerals.

Within the scope of the invention it has been found that certain types of resins when molded or cast as dentures manifest qualities not heretofore attainable in the art. Illustrative of the type of resins contemplated are those broadly referred to as allyl resins and more particularly as diallyl resins. Among the attributes provided by dentures derived from these materials are a substantial diminution of shrinkage and warpage, substantially complete resistance to water absorption, as well as enhanced resistance to wear and abrasion. Moreover, these dentures are substantially unaffected by chemical reagents of the type normally encountered in the dental profession and particularly such as occur in the oral cavity, including acidic and alkaline conditions and any other type of substances which might be found in the saliva under the most extenuating circumstances.

A particular feature of these diallyl resins is that the partially polymerized monomer functions as a substantially thermoplastic material, while the completely polymerized substance is in effect a thermoset resin. Moreover, preferred types of these resins, the monomeric forms of which are esters which involve polybasic acid and polyhydric alcohol radicals and have terminal allyloxy radicals attached to a carbonyl group, permit a control of their polymerization reaction not heretofore possible. Thus, even though polymerization of these resins monomers has been initiated, the completion of the polymerization may be terminated at substantially any interval prior to the thermoset stage.

Illustrative of the aforesaid preferred resins which have been found especially desirable for dental prosthesis are those derived from linear chain type organic esters having two terminal allyl radicals. These preferred materials have been available in their monomeric form under the trade-name "Allymer" and include bis [N-(carballyloxy) aminoalkyl] carbonates disclosed in the patent to Franklin Strain No. 2,397,631 dated April 2, 1946; polyalkylene glycol bis (allyl carbonates) described in the patent to I. E. Muskat and Franklin Strain No. 2,370,565 dated February 27, 1945; and materials of the type disclosed in the application of Franklin Strain Serial No. 528,161, filed March 25, 1944.

The optimum embodiment of material comprises the monomeric ester referred to under the trade-name of Allymer C. R. 149, prepared in accordance with the description of Example I of the said Strain Patent No. 2,397,631, this being identified as bis [N-(carballyloxy) aminoethyl]carbonate with the following structural formula:

Another desirable monomer within the type of materials referred to above is that which has been commercially identified as "Allymer" C. R. 39, specified in Example II of the aforesaid Muskat et al. Patent No. 2,370,565, this being diethylene glycol bis (allyl carbonate), prepared similarly to the triethylene glycol bis (allyl carbonate) as described in Example I of the patent. The probable structural formula of the said diethylene glycol bis (allyl carbonate) is as follows:

The product of the "Allymer" type in the said Strain application Serial No. 528,161 which is of distinct interest as a desirable species for producing the resins contemplated by the present invention is that described in Example III, pages 7 and 8 of the application, and particularly column 4 of the table commencing at line 4 on page 8, disclosing the preparation of the monomer identified as C. R. 39 Bd. and comprising diethylene glycol bis (allyl carbonic acid ester) with a varying proportion of maleic anhydride.

The following tabulation provides illustrative properties pertaining to bis [N-(carballyloxy) aminoethyl] carbonate ("Allymer" C. R. 149) and diethylene glycol bis (allyl carbonate) ("Allymer" C. R. 39), but it is clearly to be understood that the scope and adaptation of the invention are not intended to be restricted to these particular substances nor are the figures presented to be construed as limitative.

catalyst particles remaining undissolved may be removed by filtration, as through a cheese cloth. The time and temperature resorted to for purposes of dissolving the catalyst in the monomer may be the subject of variation, dependent upon the conditions of operation, the characteristics of the catalyst, and the quantity of the monomer. For example, the time may be substantially reduced by using a reprecipitated benzoyl peroxide; the latter substance is obtainable by dissolving granular peroxide in acetone at a temperature of approximately 40° C., filtering the resultant solution, adding the same to cold water, stirring, filtering, and finally thoroughly air drying the precipitate.

When it is intended to store the monomer containing the catalyst, a positive cooling treatment to storing temperature is desirable after the solution of the catalyst in the liquid monomer at the aforementioned temperature range of 50° C.–60° C., in order to terminate any tendency toward progressive thickening or polymerization.

When the liquid terminal allyloxy ester monomer, irrespective of the preferred type of monomer utilized, is heated in the presence of the peroxide catalyst, a gradual increase in viscosity is manifested, followed by a gel formation of increasing density, and as the polymerization proceeds to completion, a solid, hard product is obtained which resembles thermoset resins in its

| Property of | Bis [N-(carballyloxy) aminoethyl] carbonate | Diethylene glycol bis (allyl carbonate) |
|---|---|---|
| *Monomer* | | |
| Physical state—normal atmospheric temp | Crystalline | Liquid. |
| Melting point | 45° C | |
| Boiling point | Over 250° C. (decomp) | 160° C. (2 mm. of Hg). |
| Flash point | 169° C | 172° C. |
| Refractive index $N_D^{30}$ | 1.478 | 1.450. |
| Specific gravity 25° C./4° C | 1.22 | 1.13. |
| Viscosity at 25° C | none-solid | 19.5 centipoises. |
| Viscosity at 70° C | 39–50 centipoises | 6.4 centipoises. |
| Storage properties, 25° C | Several months | Several months. |
| *Polymerized clear castings* | | |
| Density | 1.34 | 1.32. |
| Hardness, Rockwell M | 117 | 95–100. |
| Tensile strength, 25° C. p. s. i | 11,000–13,000 | 5,000–6,000. |
| Compressive strength, 25° C. p. s. i | 26,000 | 22,100. |
| Flexural strength, 25° C. p. s. i | 25,000–31,000 | 9,500. |
| Impact, notched Izod, ft.lbs./in | 0.3–0.6 | 0.3–0.4. |
| Water absorption, per cent, 24 hrs., 25° C | 0.2 | 0.2. |
| Water absorption, per cent, 24 hrs., 100° C | 0.6 | 0.7. |

The preferred catalyst for the polymerization of these terminal allyloxyester monomers is benzoyl peroxide in an approximate range of concentration of 3% to 5%. However, this concentration may be subject to variation and other catalysts are within the contemplation of the disclosure, especially peroxide catalysts.

Indicative of a convenient mode of including the catalyst in the monomer as a preliminary to polymerization, and referring to [bis N-(carballyloxy)aminoethyl]carbonate by way of illustration in this connection, after the monomer crystals have been liquefied by heating to a temperature within the approximate range of 50° C.–60° C., the catalyst, such as benzoyl peroxide, in desirable concentration, is dissolved therein. To facilitate this solution of catalyst in the liquid monomer, agitation is desirably resorted to, and an advisable expedient for this purpose is to introduce a comparatively small amount of compressed air at the bottom of the tank containing the liquid monomer.

An estimate of the time requirement for dissolving the catalyst in a substantial batch of liquid monomer at 60° C., may vary between one and a half hours and two and a half hours. Any properties. For example, dentures cast from the preferred diethylene glycol bis (allyl carbonate), and especially bis [N-(carballyloxy) aminoethyl] carbonate, are substantially unaffected by any conditions which may be encountered in the mouth, or by substances which may be taken orally; in the category of reagents which have no effect upon such dentures in the oral cavity are acetone, vinegar, alcohol, ferrous medicaments, lipstick staining and troublesome chewing gum cohesion.

Additional particularly desirable characteristics of dentures formed from these preferred monomers when polymerized are their non-toxicity, lack of odor, and resistance to water absorption at temperatures and under conditions adaptable for sterilization, and an improved strength and resistance to wear and abrasion not heretofore attainable in the art. From a procedural standpoint, the production of castings is substantially simplified as compared, for example, with acrylate dentures, since substantially little, if any, pressure is required in the molding operation of the preferred resins, whereas considerable pressure must be relied upon in the case of the acrylates. Moreover, these resins polymerize exothermically, substantially without evolving gaseous or other by-products.

The feature of gradual polymerization and the susceptibility to controlled termination of the polymerization at substantially any point prior to the thermoset state, is similarly of distinct advantage in molding or casting of dentures. This property permits the alternative possibilities of casting the resin at any stage of polymerization prior to gellation, as well as molding the plastic mass after the gel has been formed but before it has been converted to the thermoset condition.

In view of the shrinkage value of polymerized diethylene glycol bis (allyl carbonate) to the extent of 14%, or that of polymerized [bis N-(carballyloxy) aminoethyl] carbonate in the amount of 9%, it will be noted that these figures per se indicate a distinct improvement over that attainable with such prior art dental resins as those of acrylate or vinyl compound derivation. Moreover, taking advantage of the feature of polymerization control to an intermediate stage, it will be apparent that where a denture is moulded or cast from a partially polymerized allymer monomer, the extent of shrinkage from the point of molding or casting to the thermoset state is necessarily reduced as compared with the total shrinkage between the unpolymerized monomer liquid and the thermoset product. Accordingly defects of dentures attributable to excessive shrinkage, often manifested by an undue amount of warping, are substantially minimized.

Of special significance within the purview of the invention is the discovery that molded or cast plastic materials, and particularly synthetic resins, may be substantially strengthened and improved by the appropriate inclusion therein of discrete inert fibers which are inert relative to the plastic or resin and substantially unaffected by the conditions of molding or casting. As distinguished from the conventional practice of embodying a substantially preponderant proportion of reinforcing material, usually in the form of a woven fabric, in the resin for attaining an increase in strength, as illustrated by laminated articles, it has been found that an unusually impressive improvement in the quality is attainable from a minor proportion of substantially discrete fibers.

Entirely contrary to the general trend of the art and to expectations, it has been noted that comparatively short fibers, that is, fibers of a length which substantially do not tend to intertwine or agglomerate, may provide a remarkable improvement in the strength of resins, or articles made therefrom, and afford especially optimum resin compositions for the art of dental prosthesis or the like. Thus, where fibers, and preferably glass fibers, are utilized in such length and in such proportion as to result in an at random dispersion or suspension of discrete fibers in the polymerized resin and substantially free from agglomeration or intertwining, the wearing properties, abrasive resistance, and general strength of articles made therefrom shows a very substantial improvement over the comparative properties of the resin per se. It is particularly significant that very substantial improvement is obtainable even though the content or proportion of fiber relative to resin is distinctly minor, and this feature is of especial importance in the dental art.

Thus, by way of illustration, dentures, such as base plates, cast or molded from resins having discrete fibers dispersed or suspended therein manifest properties not heretofore obtainable in the art while providing requisite aesthetic characteristics. Indicative of optimum dentures which show a distinctive improvement in impact strength, wear and abrasion resistance, as well as chemical inertness are those made from a preferred monomer having short glass fibers in discrete suspension or dispersion therein and polymerized. The preferred embodiment of such dentures has been that obtained from [bis N-(carballyloxy) aminoethyl] carbonate and glass fibers which are less than ¼ inch in length, the polymerized article containing the discrete fibers suspended or dispersed therein, substantially without intertwining or agglomeration. The features relative to optimum length, diameter, and content of fibers are considered hereinbelow.

Illustrative of the type of fiber which may be utilized are artificial wool fibers, which are of soya bean derivation, nylon fibers, mica fibers and the like. However, the fiber which has been found to comprise the preferred and optimum embodiment of the invention is the glass fiber. The appropriate dispersion of glass fibers in various resins and plastics, and particularly resins or plastic compositions of the type which have been utilized in the fabrication of dentures of artificial teeth, provides a substantial improvement in those resins for the purpose contemplated. Among the types of material which have shown a marked improvement in their properties by the appropriate inclusion of inert fibers and particularly glass wool or fiber glass, preferably in the form of short discrete fibers, are plastic compositions, such as vulcanite, cellulose acetate resins, Celluloid resins and the like.

A distinct improvement has been manifested by resins comprising polymerized unsaturated compounds, particularly those applicable to the dental art, wherein the monomers embrace a vinyl or ethylene linkage, such as the acrylic resins illustrated by methyl methacrylate, the styrene resins, including polydichlorostyrene and cerex, as well as the vinyl resins. Phenol formaldehyde, urea resins, and the conjoint polymer of vinyl chloride and vinyl acetate, et cetera, have also provided advantageous results by the inclusion of fibers pursuant to the invention.

While the fibers are preferably embodied at random in the resin, and in substantially uniform distribution, especially for dentures, artificial teeth and the like, orientation of the fibers may be desirable in other arts. Particularly with respect to denture prosthesis, an agglomeration of fibers is undesirable from the standpoint of uniform strength increase, as well as aesthetic, requirements.

The proportion of fiber disseminated in any given resin, preferably in the liquid state in order to attain a substantially uniform distribution, will be affected by the particular usage to which the composition is to be applied and the extent to which the resin properties are to be modified by the fiber inclusion. For purposes of attaining an improvement in impact strength, resistance to wear and abrasion, et cetera, it has been found that a proportionate content of as much as 35% may give satisfactory results.

Preferred results in the fabrication of dentures have made it desirable not to exceed approximately 30%.

It is to be understood that the dimension of the fiber, both as to length and diameter, simlarly affect the ultimate properties of any article molded or cast from the resin. For example, where glass fibers are utilized, in the event that the diameter becomes excessive, the fiber assumes characteristic brittleness, thereby diminishing the reinforcing effect. Similarly, excessive fiber lengths tend to result in undesirable agglomerations, and where the casting of small articles is contemplated, excessive lengths render this procedure inefficient and difficult as a result of the tendency to agglomerate and to clog the sprue.

As a generalization, it has been found desirable to utilize fiber lengths ranging between approximately 0.01 inch and ¼ inch. For fiber diameters, an effective approximate range is between 0.0045 inch and 0.00004 inch. Thus a substantial latitude in fiber diameter is available, and quite satisfactory results have been obtained from various diameters within the range indicated. Quite effective diameters have been proven to be within the approximate range of 0.00022 inch to 0.00048 inch.

As for the fiber content relative to the resin or plastic, this may be subject to variation, dependent upon the article and/or the characteristics sought as well as the properties of the fiber. Thus where translucency of the article is important, the extent that the fiber is free from objectionable or undesirable coloration may have a bearing upon the amount utilized. Practicable improvements have been attained by the approximate fiber range of 1½% to 35% of the resin or plastic.

Illustrative of an extremely desirable adaptation of these molecularly reinforced compositions, appropriate resins having short glass fibers dispersed therein and cast or molded as a denture, whether it be the plate per se or the artificial teeth as well, have shown a surprising increase in their impact and flexural strength, resistance to abrasion and wear, and other improvement.

Referring to a preferred embodiment of the invention pertaining to denture and artificial teeth fabrication, a remarkable improvement has been attained where short glass fibers have been dispersed or distributed in bis[N-(carballyloxy) aminoethyl] carbonate at any appropriate stage prior to final polymerization. It will be appreciated that in addition to an improvement in the strength of the denture or artificial tooth, the aesthetic attributes thereof are recognized as of primary importance. With this in mind, the desirable range of glass fiber inclusion in the preferred type resins as hereinabove noted, has been found to be within the approximate range of 10% to 25%. Concentrations in excess of approximately 30% may be undesirable for casting or molding of dentures and especially artificial teeth or the like, because of the turbid effect which usually results. While such concentrations are generally unnecessary, as far as the requisites of the dental art are concerned, where aesthetic significance is of secondary moment and certain physical properties are of primary interest, concentrations substantially in excess of 30% may be utilized.

As previously noted, the fiber length has been found to provide significant improvement when utilized in dimensions from approximately 0.01 inch-¼ inch, and the effective range of diameter, substantially avoiding brittle glass fibers, has been between 0.0045 inch to 0.00004 inch.

The optimum embodiment resulting in a remarkable denture plate has been produced with a glass fiber concentration of about 22%, with the fiber length approximately 0.01 inch, and the diameter of 0.00022 as an average fiber. Excellent dentures have also been obtained where the fibers have been approximately 0.2 inch in length, and even approached 0.25 inch, with a diameter of about 0.00022 inch to 0.00048 inch. Where the dimension has been ¼ inch or over, there has been a tendency of the fibers to intertwine or agglomerate.

Indicative of the enhanced strength of dentures involving the above noted optimum concentration of glass fiber of preferred dimensions, dentures cast from bis[N-(carballyloxy) aminoethyl]carbonate may be dropped from a height of at least six feet on to a concrete surface without any detrimenetal effect whatsoever, and the same results have been attained at heights of as much as twenty feet and over. No comparable revelation of impact strength has heretofore been attainable in connection with any non-metallic type of dentures which have received recognition in the art. Further illustrative of the improved properties of this optimum type of denture, applying a substantial pressure thereto while it is supported on a hard surface as by stepping thereon, similarly causes no damage thereto; a comparable load or pressure applied to a methyl methacrylate denture, or a so-called vinyl denture, or a vulcanite denture, or to any of the other known types, will result in substantially shattering the denture.

The optimum range of glass fiber inclusion indicated in connection with the preferred resins, such as bis[N-(carballyloxy) aminoethyl]carbonate, will provide the desired translucency in the denture or artificial tooth. Since the resin when cast is essentially transparent, where the glass fibers are also transparent, their presence in the denture will not be visible, especially where the refractive index of the glass is essentially the same as that of the resin. On the other hand, with a glass manifesting an index of refraction which is substantially clearly differentiated from that of the resin, stippled dentures may be obtained, and this effect may also be produced by resort to appropriately colored glass fibers utilized in reinforcing the resin.

These dentures or artificial teeth lend themselves to desirable shading or coloration by the supply of pigment to the above described preferred resins, and/or by controlling the color of the glass fibers embodied therein. In this manner plates can be produced to resemble the natural color prevailing in the mouth or tooth tissues, or if desired, an opalescent effect can be created. The particular type of glass fiber utilized will also manifest an effect on the physical properties of the denture; thus, with a leaded glass, a comparatively heavy denture may be obtained, suitable as a weighted lower denture. In general, it may be said that the physical characteristics of the glass fibers will inherently affect the properties of the denture casting or molding, and an excessive addition of fibers may result in undesirable turbidity, objectionable agglomeration, or even interfere with casting operations, where this is contemplated.

Suggestive of the manner of dispersing the fibers in the resin, to facilitate an effective distribution, it is preferred to add the fibers to the resin monomer when in its most fluid state. In the case of the preferred monomers, the expedient point of fiber addition is before polymerization has been initiated. However, there is no intent to be restricted to this particular interval of fiber admixture, since the fibers may be added at any stage where their effective, uniform dispersion in the body of the resin is possible. Thus, for example, bis [N-(carballyloxy) aminoethyl] carbonate in its crystalline form may be finely ground and the predetermined content of fibers admixed with the powdered monomer; at the time of utilization of the composition, the mixture may be heated with or without additional agitation, whereby the fibers become distributed in the liquid monomer during the course of the requisite heat treatment directed to the complete or partial polymerization contemplated.

The preferred and optimum fibers, namely, glass fibers, or glass wool where the fibers are appropriately segregated, are embodied in the resin monomers on the same basis as indicated above in connection with the inclusion of fibers broadly in the monomer. Thus, the glass fibers, such as "Fiberglas" in desirably discrete fiber form, may be added to the preferred monomer per se or at any stage of polymerization prior to substantial gellation, and preferably to the liquid monomer before polymerization has commenced. However, as previously noted, the fundamental requisite is that the monomer is in a condition that will permit a substantial distribution of discrete fibers. Where a pigment is contemplated, this should be supplied before any excessive stage of gellation has been reached, in order to obtain a uniform admixture of the pigment. As for the addition of the catalyst, this has been indicated hereinabove, and the fundamental principle of attaining a uniform distribution similarly applies. As a convenient expedient for attaining a uniform distribution of fibers, any convenient means of agitation may be resorted to.

With the resin monomer containing the predetermined type and content of fiber in a random dispersion, as well as other perfecting ingredients, the composition is in condition for polymerization. This is accomplished by a desirably regulated heat treatment, and as has been previously stated, the preferred resins manifest the characteristic of becoming increasingly viscous as the heat treatment continues, passing through a gel state and finally solidifying as a thermoset composition, all under temperature regulable conditions. The preferred results are to be obtained by carrying out the polymerization at periodically increasing temperatures. Desirably the initial temperature is such as to promote a reasonably uniform, rapid reaction directed to gradually increasing the viscosity of the liquid monomer, care being taken that the temperature is not sufficient to cause any local overheating which tends to promote objectionable strain in the mold or casting that may result in heat fractures and/or injury to the catalyst. Having maintained the temperature at a given point for a time interval determinable by one skilled in the art, the temperature is subjected to incremental increases as the polymerization proceeds. During the early stages of heat treatment, a given temperature is desirably maintained until gelation occurs, and then the temperature is periodically raised at progressively shorter time intervals until the soft gel becomes comparatively stiff. The polymer may then be heated at the upper limit of polymerization range to develop maximum hardness. In general, the temperature which is most economical, is the maximum which will promote polymerization at any given interval without causing injury or damage to the ingredients or to the ultimate cast or molded article.

The following is illustrative of a desirable polymerization temperature schedule where the monomer is diethyleneglycol bis (allyl carbonate) containing 3% of benzoyl peroxide, showing the initial temperature, as well as the maximum:

| Temperature | Minutes |
|---|---|
| 72° C | (¹) |
| 73° C | 60 |
| 74° C | 60 |
| 75° C | 60 |
| 76° C | 60 |
| 77° C | 60 |
| 78° C | 50 |
| 79° C | 50 |
| 80° C | 40 |
| 81° C | 30 |
| 82° C | 20 |
| 83° C | 20 |
| 84° C | 20 |
| 85° C | 15 |
| 86° C | 15 |
| 87° C | 15 |
| 88° C | 15 |
| 89° C | 10 |
| 90° C | 10 |
| 91° C | 10 |
| 92° C | 10 |
| 93° C | 10 |
| 94° C | 15 |
| 96° C | 10 |
| 98° C | 15 |
| 101° C | 10 |
| 104° C | 10 |
| 107° C | 10 |
| 111° C | 5 |
| 115° C | 5 |
| | 720 |

¹ Until gelation occurs.

In the case of the preferred embodiment of monomer, namely, [bis N-(carballyloxy)aminoethyl] carbonate, a similar schedule may be adhered to, any variations being within the skill of one versed in the art, and it is to be understood that such schedules are neither critical nor limitative of the procedural aspects of the invention herein.

The important property of the preferred resins to terminate polymerization at an intermediate stage by reducing the temperature below that which promotes polymerization, has been referred to, and this is of pronounced value in facilitating the obtention of cast or molded articles, and especially dentures which are substantially free from defects attributable to excessive shrinkage or to undue molding strains. Moreover, this characteristic may be an important factor for facilitating the commercial distribution of the resinous compositions for molding or casting purposes.

For example, where the mixture of bis[N-(carballyloxy)aminoethyl]carbonate contains glass fibers dispersed therein together with any desirable pigment content and catalyst, it may be partially polymerized to an extent determinable by the ultimate use contemplated and then stored or shipped as desired. In the case of casting of dentures or teeth from a preferred monomer, preferably bis[N-(carballyloxy)aminoethyl]carbonate, containing the requisite content of catalyst, with or without the inclusion of the fibers, desirably glass fibers, it may expediently be heat treated to a point of increased viscosity of the monomer, but not sufficient to relinquish the fluid characteristics desirable for efficient casting; differently stated, the partially polymerized monomer may be distributed in a fluid state for subsequent casting. On the other hand, where molding of a plastic composition is intended, the polymerization may be carried to the point of a reasonable degree of gelation which will permit shaping of the plastic mass, but insufficient to convert the same to the thermoset state, and directing this partially polymerized composition to the predetermined channels of distribution.

In connection with any of the foregoing partial polymerization, it is to be understood that at the conclusion of the heat treatment to the predetermined state of polymerization, a cooling step is desirably resorted to for the purpose of terminating the polymerization and reducing the temperature of the resin or fiber containing composition to that at which it may be stored or shipped, such as atmospheric, and in any event, below that at which polymerization would be reinitiated. This cooling step may result in a solidified mass, especially with bis[N-(carballyloxy)aminoethyl]carbonate, this monomer being primarly crystalline at atmospheric temperatures; the cooled or solidified mass may be attained in any predetermined shape or form, such as that of a sheet or block of material, and shipped or stored as such.

It has, moreover, been found that the partially polymerized fiber containing composition, such as the preferred resin having a glass fiber content, may be subjected to granulation, without substantially impairing the reinforcing attributes imparted to the mixture by the initial addition of glass fibers, provided excessive granulation to a comparatively small particle size or fine powder is avoided.

This is distinguishable from excessive grinding of the material to an extremely fine pulverulent state, since the reduction of the fibers to an impalpably fine powder will tend to minimize and even substantially eliminate the molecular reinforcement contemplated by the invention. Subject to variation pursuant to the dictates of the art, an expedient minimum range of particle size for the preliminary or partially polymerized granular composition is considered to be approximately between the 10 and 80 mesh sieve, on the Tyler Standard Screen Scale or that of the A. S. T. M.

Whether the resinous composition in a state of partial polymerization is prepared as a granular substance or in any predetermined shape or form in advance of the contemplated article casting or molding, such as in the production of dentures or artificial teeth, it is merely necessary to reheat the mixture to its fluid or plastic state, commensurate with the degree of preliminary polymerization and then to proceed with the manipulative details of casting or molding.

In this manner the time for the ultimate casting or molding is materially reduced. For example, where a denture or artificial teeth are to be made, the dentist or operator will require the comparatively short time of from one-half hour to one hour for completing the polymerization by heating in lieu of the 4½ hours to 24 hours necessary when starting with the liquid monomer.

As previously indicated, the substantial increase in strength attributable to the inclusion of discrete fibers in the resin or plastic, pursuant to the invention, is considered to be in the nature of a molecular reinforcement; it is, however, not intended to be restricted to any particular theory or explanation of this significant discovery.

While the glass fiber, such as that known under the name of "Fiberglas," may be utilized as produced for the reinforcement of resins, it is normally coated with a film or coating of a lubricant or binder during the course of production. Where the fabrication of dentures or artificial teeth are contemplated, the matter of coloration or shading is of distinct importance, and the use of such lubricant coated fibers may result in an undersirable degree of opacity or discoloration. This effect will be of no moment in the production of dark teeth or dentures, but may be objectionable in cases where aesthetic shading, coloring or natural color simulation is of prime significance. In order to avoid any discoloration or opacity by virtue of the glass fibers, they may be subjected to an appropriate heat treatment for the purpose of either partially or completely decomposing the lubricant film.

For a partial removal of the lubricant, a temperature of approximately 200° C., during a time interval of about two hours has been found to be satisfactory, and this temperature will not affect the properties of the fiber. On the other hand, for a substantial removal of the lubricant film, temperatures within the approximate range of 350° C.—400° C., may be necessary, although the higher temperatures are normally undersirable in that they tend to decrease the fiber strength. For denture purposes, this detrimental effect on the fibers resulting from high temperature treatment is not fatal to the reinforcing characteristics they may manifest in a resin composition of the type contemplated by the present invention. However, by not exceeding approximately 300° C., a substantially complete removal of the lubricant may be attained, which is quite satisfactory insofar as the aesthetic requisites of the art of dental prosthesis require.

Where such pyrolytically treated fibers have been utilized for the molecular reinforcement of resins or the like, the production of desirable dentures having optimum aesthetic translucency has involved a suspension of approximately 7% to 10% of fibers in the resin, desirably of preferred monomer derivation such as bis[N-(carballyloxy)aminoethyl]carbonate.

By substantially completely removing any adhering lubricant as well as other impurities, such as objectionable coloring material, from the glass fibers, it has been possible to increase the amount for practicable denture application to as much as approximately 35%. The optimum denture content in resins, desirably of preferred monomer derivation, of glass fibers which have been given such special treatment for removal of objectionable substances has been within the approximate range of 17% to 25%, with 22% representing a particularly desirable value.

This improvement of glass fibers may be obtained by appropriate chemical treatment or solvent extraction. For example, resort to a mineral acid, such as HCl, serves effectively to dissolve such impurities, including compounds of iron to which undesirable coloring effect is attributable insofar as denture purposes are concerned. The concentration and details pertaining to the use of the acid are within the skill of a chemist and comprise a matter of expediency; thus, the use of commercial HCl (approximately 50% conc.) for a comparatively short interval of time, fifteen minutes more or less, has been effective in the treatment of "Fiberglas" or the like. The acid treatment may be effectively relied upon as an adjunct of the heat treatment although in some cases it may replace the former.

It is to be understood, however, that while the foregoing represents a desirable example, the invention is not restricted as to the details for removal of objectionable substances from the inert fibers, such as glass fibers, nor is there any intent to be limited to particular solvent or chemical reagents for improving the properties of the fibers, since the details and the reagents may be subject to variation, within the dictates of one versed in the chemical art, in accordance with the characteristics of the fibers and the results desired.

Figure 1:
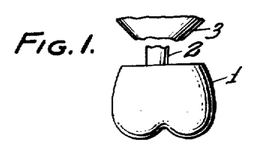
Fig. 1 is a vertical elevation of a wax tooth model of predetermined surface contour with attached wax portion to determine a sprue.

Referring to the various figures of the drawings describing a desirable illustrative procedure of casting of artificial teeth, the numeral 1 indicates a wax tooth model of predetermined type, having a stem 2, which, at its upper part diverges to a funnel shaped portion 3. As will appear hereinbelow stem 2 determines the casting sprue, whereas the funnel portion 3 is designed to define an expedient opening for supplying the monomer under conditions directed to reducing the shrinkage factor to an extreme minimum.

Figure 2:
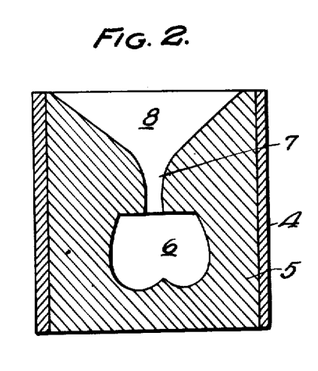
Fig. 2 is a cross sectional elevation of a mold containing the investment composition, and showing the cavity defined by the tooth model of Fig. 1, the wax comprising said model having been eliminated.

Having embedded the tooth model 1 in the investment composition 5 of mold flask 4, the wax is eliminated by application of heat in any suitable manner to cause the wax to flow out of the mold. As shown in Fig. 2, the result is a cavity 6 corresponding with the tooth design, with the sprue 7 and funnel 8 through which the monomer may be supplied.

Prior to casting of the tooth it is desirable to coat the mold cavity with any one of a number of suitable materials adapted to fill the pores of the cavity walls and thereby avoid any undue variation of the casting resulting from the seepage of resin monomer into the investment composition. Among the types of substances which may be utilized for coating the cavity walls are an alginate, a varnish solution, a rubber composition and, in brief, any material adapted to provide a substantially fluid impervious surface, and which is essentially inert with respect to both the investment composition and the resin monomer. Any preferred manner of applying the coating may be utilized, and expediently this may be accomplished by allowing the coating material to flow through the cavity so as to come into contact with the entire cavity surface, and then causing the excess of coating material to flow out. After a comparatively brief time interval for drying, dependent upon the particular coating material utilized, the cavity is in condition for casting of the tooth. In lieu of this type of coating, where the structure of the mold permits, a metal foil, such as tin foil, aluminum foil, or the like, may be placed over the cavity wall surface to protect the same.

Having prepared a fluid monomer mixture desirably reinforced with glass fiber, the fluid is poured through funnel 8 and sprue 7 into the tooth cavity 6 in quantity to fill the cavity, sprue and funnel, the mold being subjected to heating at temperatures to promote polymerization along the lines above indicated. During this supply of monomer composition, the mold is preferably subjected to a reasonable degree of vibration in order to facilitate the escape of air. By virtue of funnel portion 8 containing a comparatively large content of monomer composition, the resultant head of material on the monomer in the tooth cavity will tend to take up a portion of the shrinkage resulting from the polymerization going on in the tooth cavity. Differently stated, as shrinkage manifests itself in the tooth cavity, additional monomer mixture is forced into the tooth cavity by the head of monomer liquid in the funnel 8.

In lieu of the vibration of the mold, or as an additive precaution, desiccation may be relied upon to eliminate air from the mold and permit the monomer to completely fill the same.

Figure 3:
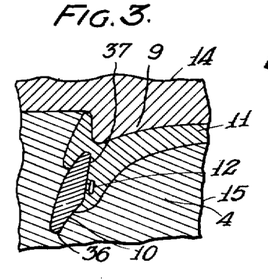
Fig. 3 indicated a vertical elevation, partially broken away, of a model of jaw impression, comprising a wax plate with porcelain teeth in situ, the model being embedded in the investment composition of a closed flask shown in fragmentary cross section.

The optimum composition, as above noted, comprises [bis N-(carballyloxy)aminoethyl] carbonate having dispersed therein glass fibers of an average approximate length of 0.01 inch in concentration of approximately 22%, the diameter of the fibers being in the vicinity of 0.00022 inch. In this connection the critical aspects of the fiber length and concentration for optimum casting, both from the manipulative standpoint and the ultimate article, are determined in view of the fact that excessive quantities of glass fiber and/or unduly long fibers may result in clouding or fiber agglomeration or intertwining, as well as clogging of the sprue to yield a defective tooth. After the heat treatment has been carried to the point of completely polymerizing the monomer and curing the same, the resin casting may be removed from the investment composition in accordance with the practice known to those versed in the art.

Where the casting of the denture is contemplated, a model 17 of the palatal portion of the mouth is desirably prepared pursuant to the usual practice in the art. The denture model 9 as shown in Fig. 3 comprises the wax plate 11 to which porcelain teeth 10 are suitably affixed, said plate corresponding to a positive reproduction of the model of the jaw; thus, denture model 9 includes palatal model 17. The porcelain teeth may be provided with appropriate undercuts or are suitably notched or grooved to facilitate a statisfactory attachment to the plate; alternatively the well-known practice of providing metallic pins 12 to facilitate the attachment may be relied upon.

The denture model 9 may then be embedded in an investment plaster composition 13 contained in mold half 14 pursuant to the usual procedure which involves filling the mold half with plaster 13 in the comparatively fluid state and embedding the denture model therein in a substantially normal horizontal position. After the plaster in mold half 14 has substantially completely set, mold half 15 is fitted upon mold half 14, and then also filled with plaster composition 13 in its fluid state. In accordance with the usual procedure, the model should be placed in the mold in such a manner that the two mold halves may be separated without any damage either to the model or to the plaster mold.

By application of heat, which may be in the form of hot water or in any other suitable manner, such as the enclosure of the flask in an appropriate zone of heat treatment, illustrated by an oven, the wax plate is fluidized and removed from the molding flask in any expedient manner.

Figure 8:
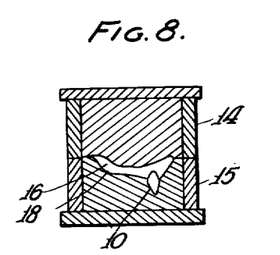
Fig. 8 is directed to a cross sectional indication of the closed flask comprising the upper and lower portions thereof, with the resinous composition filling the pertinent cavity shown in Fig. 4.

With the elimination of the wax of the denture model, there results a cavity 16 which corresponds with the shape of the model plate. Dependent upon the design of the molding flask, the two parts thereof may be separated at this point, or retained in coordinate relationship as indicated in Fig. 8, where a sprue for a supply of resin is provided. In any event, at this stage of the procedure, the respective incisal edges 36 of the teeth 10 are retained by the investment composition as will be apparent in Figs. 4 and 5, the latter comprising a perspective view of a substantially complete set of artificial teeth 10 having their gingival and retention portion exposed, and as previously stated, retained in essentially vertical position by their incisal edges supported in the investment composition.

The walls of the cavity are then desirably rendered fluid impervious by resort to a coating composition of the type previously mentioned in the casting of tooth model 1, or similarly a metal foil, exemplified by tin foil may be resorted to.

Figure 4:
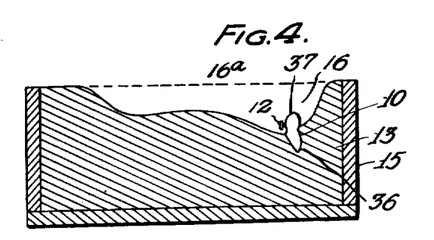
Fig. 4 presents a cross sectional showing, taken along line 4—4 of Fig. 5 of one part of the molding flask, containing the investment composition, after the wax plate of Fig. 3 has been eliminated.
Figure 5:
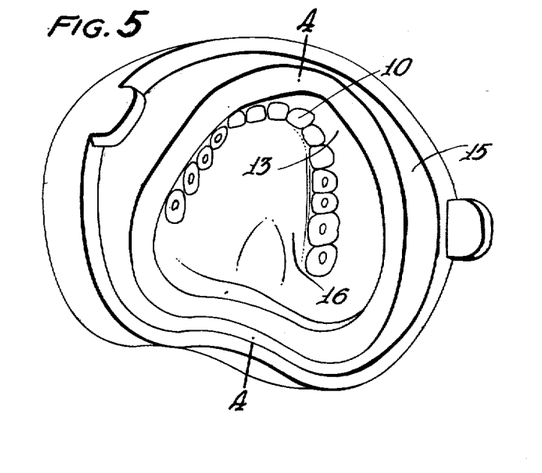
Fig. 5 is drawn to a perspective which corresponds with the showing of Fig. 4, the denture teeth being retained by the investment composition of the mold, the wax plate having been fluidized and eliminated.
Figure 6:
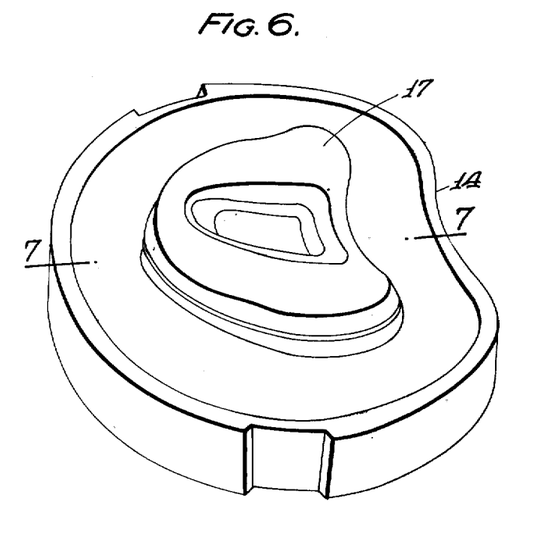
Fig. 6 comprises a perspective view of the other or complementary portion of the mold shown in Fig. 5, and containing the case model from an impression of the mouth.
Figure 7:
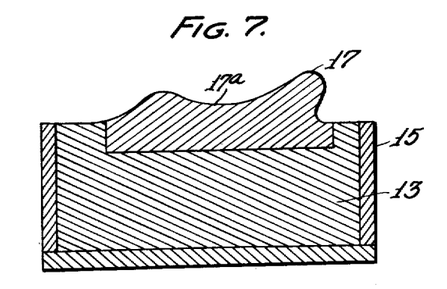
Fig. 7 is a cross section taken along the line 7—7 of Fig. 6.

The monomer composition, desirably a preferred terminal diallyloxy monomer, as hereinabove described containing an optimum content of glass fiber, as well as a catalyst and any other perfecting ingredients contemplated, when in a fluid state, and if desired, partially polymerized, may then be supplied to mold cavity 16. As previously explained, where the monomer is partially polymerized before casting or molding thereof, the shrinkage differential may be substantially reduced. In the event that a suitable sprue is available, the monomer may be poured through this sprue. On the other hand, where the two parts of the mold flask 14, 15, have been separated subsequently to elimination of the wax plate, resin may be supplied to the cavity 16 as indicated in Fig. 4. Prior to the supply of resin, the teeth may be notched or grooved in the gingival portion to facilitate an efficient retention by the denture base, in the event that the teeth are not already provided with appropriate means for that purpose.

It will be understood that the molding flask or portions thereof will be subject to heating for the purpose of promoting a temperature controlled polymerization. Desirably the fluid monomer is poured on one side of the cavity and then on the other in order to facilitate the filling of the spaces between the teeth of the denture, although it is not to be restricted to this particular manner of supplying the resinous material; the manner of supplying the monomer will depend upon the design of the flask and the sprues provided for the ingress of the molding composition. Where the two parts of the flask are separated, it will be a comparatively simple matter of directing the resinous composition to the predetermined areas of the cavity 16. A simple expedient effective in reducing the shrinkage factor, is to supply the resin material in quantity sufficient to completely cover the gingival portion 37 of the teeth, but insufficient to fill the mold cavity. As the polymerization progresses and the monomer congeals to the gel state, additional monomer is supplied to fill the cavity to its capacity as indicated by line 16a. At this point, if the portion of the mold 14 is not in closed position with respect to the mold half 15, pursuant to the showing of Fig. 8, the flask portion should be clamped together, as by use of a conventional spring clamp; under these circumstances, any excess monomer will be forced out from the flask either between the two halves thereof, or through any appropriate outlet capable of serving this purpose, the monomer 18 retained by the flask determining the resin denture plate.

The heating is, as aforesaid, carried to the point of completely polymerizing the resinous composition, and this composition is desirably an optimum embodiment of preferred monomer. A heating schedule may desirably be adhered to in accordance with the above disclosure until the thermoset state has been reached. The parts of the monomer flask are then separated in any expedient manner pursuant to the usual practice in the art, the underlying purpose being to avoid breakage of the casting. During the casting procedure, any desirable course may be relied upon for causing the resin to completely fill the cavity and eliminate air, and this may be accomplished either through appropriate vibration of the flask or by desiccation.

Where the teeth are to be of resinous derivation similar to the plate, the procedure may illustratively be altered to the extent that the original denture model 9, as well as the teeth 10, may be of wax, with the result that upon elimination of the model from the investment composition in which it has been appropriately embedded, the cavity to which resin monomer is to be supplied will be correspondingly altered. It is not intended to be restricted to this procedure, however, since variations therein will be apparent within the scope of the invention. For example, it may be found desirable to cast the plate as hereinabove described, the teeth attached thereto being of removable type, and subsequently to affix separately cast resin teeth to the plate.

In the event that a molding procedure is desired in lieu of the aforedescribed casting, the respective portions of the flask will be supplied with the monomer composition desirably polymerized to a plastic gell state. The manner of filling the portions of the mold with this partially polymerized monomer may be in accordance with known practices in the art.

Figure 9:
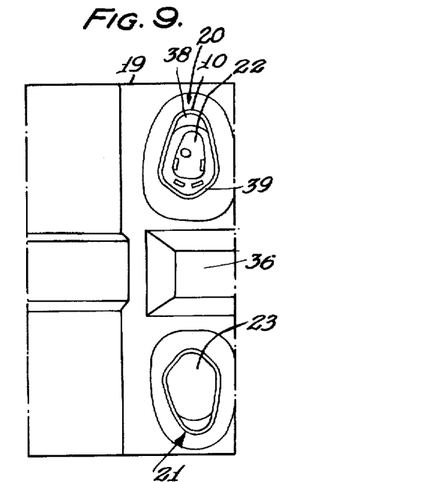
Fig. 9 is a plan view of the labial half of an alternative form of tooth mold.
Figure 10:
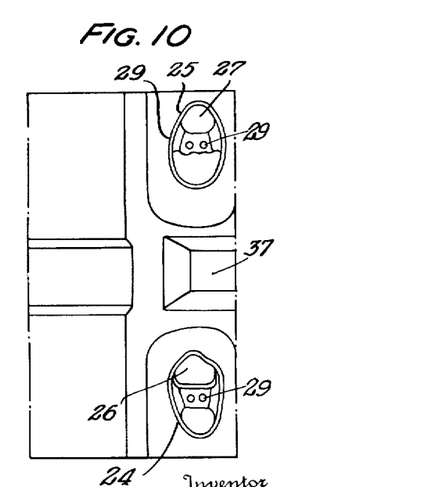
Fig. 10 comprises the lingual half complementary to the labial mold portions shown in Fig. 9.
Figure 11:
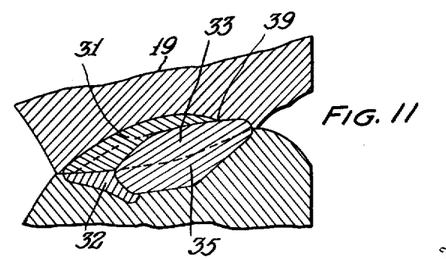
Fig. 11 pertains to a fragmentary cross sectional showing of the two halves of the mold coordinated to close the same, with a desirable embodiment of the resin composition determining a given tooth structure.

Alternative to the tooth casting procedure discussed in connection with Figs. 1 and 2, a molding operation may be utilized pursuant to the showing of Figs. 9-11. This expedient molding apparatus comprises a lower block which may be provided with the labial half of the mold for a plurality of teeth of the same or different type. In Fig. 9, the labial portions 20 and 21, respectively, of two teeth are designated, the corresponding cavities being 22 and 23. The lingual halves of the teeth corresponding to labial halves 20 and 21 are indicated as 24 and 25, respectively. The cavity 26 pertains to lingual portion 24 and cavity 27 applies to lingual half 25.

Pins 29 are shown for purposes of embodiment in the respective teeth, but the presence of such pins is dependent upon the material utilized and the features of teeth contemplated. The two blocks may be interfitted by coordinated means 36 and 37. In molding the teeth, the monomer should be in a plastic condition, desirably in the form of a substantially heavy gelled monomer, or partially polymerized powdered monomer corresponding thereto. Thus where a diallyl resin of the preferred type is desirably utilized, preferably [bis N-(carballyloxy) aminoethyl] carbonate, the monomer composition should be in a partially polymerized state to the extent that a plastic gell has been formed. In the preferred embodiment, as in the case of the other modifications of the disclosure, the partially polymerized composition is one containing reinforcing fibers, preferably glass fiber.

At least a portion of the partially polymerized plastic preferred or terminal allyloxy ester monomer should be colored to simulate the tooth enamel and utilized to coat the labial cavities 22, 23, etc. This enamel coat is desirably applied in the form of a decreasing thickness of material, the maximum being at the incisal edge 26, having an approximate thickness of at least one millimeter, this edge being exclusively of this enamel type material. The thickness of the enamel may decrease from the incisal edge in the direction of the gingival portion of the tooth. The lingual half of the tooth may desirably also be provided with an enamel layer. As shown in Fig. 11, 31 comprises the enamel coating of the labial half of the mold, while 32 is the lingual enamel. Superimposed upon this enamel coating, a somewhat softened mass of gelled monomer of predetermined coloration, desirably differentiated from the enamel shade, is supplied in quantity to fill the respective cavities of the mold halves, the body portion of the labial half being indicated as 33, while that of the lingual half is shown as 35. The mold parts are then fitted together and the requisite heat treatment is resorted to for the purpose of completing the polymerization and curing.

While the foregoing presentation has been in terms of a plastic or resinous composition involving but a single resin or plastic, it is within the contemplation of the invention to utilize resinous mixtures. Thus, by way of illustration, diethylene glycol bis (allyl carbonate) and bis[N-(carballyloxy) aminoethyl] carbonate, are compatible with a substantial variety of compounds, including plasticizers and resin monomers. Illustrative of these substances are acetone, alcohol, dibutyl phthalate and triacetin, all of which are compatible either with the unpolymerized or partially polymerized monomer; these substances tend to manifest a softening or weakening effect on the cure of the polymer. Sucrose octaacetate is likewise compatible with either the monomer as such, or partially polymerized, and this compound, in limited amounts, tends to have a slight hardening effect on the polymer cure. Polyvinyl acetate may be utilized to modify either diethylene glycol bis (allyl carbonate) or bis[N-(carballyloxy) aminoethyl] carbonate, but its compatibility is primarily with the monomer and in the case of the partially polymized monomer is definitely limited; this compound provides a slight softening of the polymerized preferred monomer.

Such resin monomers as vinyl acetate, methyl methacrylate and styrene are also desirably compatible with the preferred monomers, especially diethylene glycol bis (allyl carbonate) and bis [N-(carballyloxy) aminoethyl] carbonate either with the monomer as such or during polymerization; the exception is in the case of styrene, which is combinable with the partially polymerized monomer only to a limited extent. The vinyl acetate and methyl methacrylate tend to provide increased thermoelasticity, whereas styrene contributes a softening effect and in some cases may tend to inhibit the cure of the polymer. Nitrocellulose and cellulose acetate are inclined to cause a softening effect on the cured polymer, but their extent of compatibility with the monomer resins is variable; thus while these substances are more or less compatible with monomer bis [N-(carballyloxy) aminoethyl] carbonate, with respect to monomer diethylene glycol bis (allyl carbonate) the extent of compatibility is substantially limited.

Accordingly, mixtures of the predetermined preferred monomer with any compatible substance may be resorted to for the purpose of modifying the properties of the ultimate article made from the cured polymerized composition, and the appropriate fiber inclusion in the mixture, preferably glass fiber, for purposes of internal or molecular reinforcement is likewise contemplated within the scope and purview of the invention and in accordance with the optimum features of resins, fiber dimensions, suspension or dispersion of discrete fibers et cetera, as above disclosed.

The wide adaptation of the invention hereinabove described will be apparent from the preferred embodiments disclosed. Thus within its scope is the improvement in plastic or resinous substances by the at random inclusion therein of discrete fibers in minor proportion to provide a substantial enhancement in the properties of articles made therefrom. The extensive field of application of this feature is only partially determined by the usage to which the resins or plastics per se may be directed, since the improvement in the various properties of the resin or plastic may render them aplicable in arts and under circumstances not heretofore contemplated.

The art of dental prosthesis reveals an optimum adaptation of the invention, since dentures or artificial teeth prepared from resins which are reinforced as disclosed herein, manifest desirable characteristics which so completely surpass that of prior art dentures as to emphasize their difference in kind. However, it will be apparent that this invention is in no sense restricted to this art, since comparable advantages and improvements may be attainable in other fields. Merely by way of illustration and not of limitation, among the widely diversified types of articles which may be fabricated within the scope of the disclosure are combs, ash trays, rims of glasses, picture frames, various utensils, et cetera.

The preferred embodiment of dentures or teeth fabricated from the preferred monomers, and especially bis [N-(carballyloxy) aminoethyl] carbonate per se, comprise a distinct advance in the art. The reinforcement of this preferred diallyl resin with fiber pursuant to the disclosure, and particularly with glass fibers, has resulted in an advance and contribution to the art beyond comparison with the present state thereof.

It will be understood that the broad reference herein to the "molding" procedure and equivalent terminology is intended to generically embrace the procedure involving either the casting of the liquid resin or the filling of a mold with a plastic or gelled material. Similarly the broad reference herein to a "molded" product or article contemplates the results obtained by either of the type of procedures referred to.

While I have described my invention in accordance with desirable embodiments and details of procedure, it is obvious that many changes and modifications may be made in the details of construction and in the characteristics of the product and articles obtained without departing from the spirit of the invention as defined in the following claims.

Having thus set forth my invention, I claim:

1. A composition comprising a polymerizable material from the group consisting of a bis [N-(carballyloxy) aminoalkyl] carbonate, a polyalkylene glycol bis (allyl carbonate) and the product containing diethylene glycol bis (allyl carbonic acid ester) with maleic anhydride, said composition containing discrete glass fibers dispersed therein in the approximate concentration range of 7% to 35%, said fibers having a diameter in the approximate range of 0.00045 inch to 0.00004 inch and a length in the approximate range of 0.01 inch to 0.25 inch, said composition being at least partially polymerized.

2. A composition comprising bis [N-(carballyloxy) aminoethyl] carbonate containing discrete glass fibers dispersed therein in the approximate concentration range of 10% to 25%, the dimension of said fibers being a length in the approximate range of 0.01 inch to 0.2 inch and a diameter in the approximate range of 0.00022 inch to 0.00048 inch, said composition being at least partially polymerized.

3. A composition comprising diethylene glycol bis (allyl carbonate) containing discrete glass fibers dispersed therein in the approximate concentration range of 10% to 25%, the dimension of said fibers being a length in the approximate range of 0.01 inch to 0.2 inch and a diameter in the approximate range of 0.00022 inch to 0.00048 inch, said composition being at least partially polymerized.

4. A composition comprising diethylene glycol bis (allyl carbonic acid ester) with maleic anhydride containing discrete glass fibers dispersed therein in the approximate concentration range of 10% to 25%, the dimension of said fibers being a length in the approximate range of 0.01 inch to 0.2 inch and a diameter in the approximate range of 0.00022 inch to 0.00048 inch, said composition being at least partially polymerized.

5. A composition comprising bis [N-carballyloxy) aminoethyl] carbonate containing discrete glass fibers dispersed therein in the approximate concentration of 22%, the dimension of said fibers being approximately 0.00022 inch in diameter and 0.01 inch in length, said composition being at least partially polymerized.

6. A composition comprising a polymerizable material from the group consisting of a bis [N-(carballyloxy) aminoalkyl] carbonate, a polyalkylene glycol bis (allyl carbonate) and the product containing diethylene glycol bis (allyl carbonic acid ester) with maleic anhydride, said composition containing discrete glass fibers dispersed therein in the approximate concentration range of 7% to 35%, said fibers having a diameter in the approximate range of 0.00045 inch to 0.00004 inch and a length in the approximate range of 0.01 inch to 0.25 inch, said composition being partially polymerized and in the form of substantially coarse granules of a particle size adapted to pass a 10 mesh sieve and be retained on an 80 mesh sieve.

7. A denture comprising a completely polymerized material from the group consisting of a bis [N-(carballyloxy) aminoalkyl] carbonate, a polyalkylene glycol bis (allyl carbonate) and the product containing diethylene glycol bis (allyl carbonic acid ester) with maleic anhydride, said material containing discrete glass fibers dispersed therein in the approximate concentration range of 7% to 35%, said fibers having a diameter in the approximate range of 0.0045 inch to 0.00004 inch and a length in the approximate range of 0.01 inch to 0.25 inch.

8. A denture comprising a molded base plate and a molded tooth or teeth integral therewith, the composition of said base plate and of said tooth or teeth comprising a completely polymerized material from the group consisting of a bis [N-(carballyloxy) aminoalkyl] carbonate, a polyalkylene glycol bis (allyl carbonate) and the product containing diethylene glycol bis (allyl carbonic acid ester) with maleic anhydride, said material containing discrete glass fibers dispersed therein in the approximate concentration range of 7% to 35%, said fibers having a diameter in the approximate range of 0.0045 inch to 0.00004 inch and a length in the approximate range of 0.01 inch to 0.25 inch.

9. A denture comprising a molded base plate and a molded tooth or teeth integral therewith, the composition of said base plate and of said tooth or teeth comprising completely polymerized bis [N-(carballyloxy) aminoethyl] carbonate containing discrete glass fibers dispersed therein in the approximate concentration of 10% to 25%, the dimension of said fibers being a length in the approximate range of 0.01 inch to 0.2 inch and a diameter in the approximate range of 0.00022 to 0.00048 inch.

10. A denture comprising a molded base plate and a molded tooth or teeth integral therewith, the composition of said base plate and of said tooth or teeth comprising completely polymerized bis [N-(carballyloxy) aminoethyl] carbonate containing discrete glass fibers dispersed therein in the approximate concentration of 22%, the dimension of said fibers being approximately 0.00022 inch in diameter and 0.01 inch in length.

11. A molded dental base plate comprising completely polymerized bis [N-(carballyloxy) aminoethyl] carbonate containing discrete glass fibers dispersed therein in the approximate concentration of 10% to 25%, the dimension of said fibers being a length in the approximate range of 0.01 inch to 0.2 inch and a diameter in the approximate range of 0.00022 to 0.00048 inch.

12. A molded dental base plate comprising completely polymerized diethylene glycol bis (allyl carbonate) containing discrete glass fibers dispersed therein in the approximate concentration of 10% to 25%, the dimension of said fibers being a length in the approximate range of 0.01 inch to 0.02 inch and a diameter in the approximate range of 0.00022 to 0.00048 inch.

13. A molded dental base plate comprising completely polymerized bis [N-(carballyloxy) aminoethyl] carbonate containing discrete glass fibers dispersed therein in the approximate concentration of 22%, the dimension of said fibers being approximately 0.00022 inch in diameter and 0.01 inch in length.

14. A molded artificial tooth comprising a completely polymerized material from the group consisting of a bis [N-(carballyloxy) aminoalkyl] carbonate, a polyalkylene glycol bis (allyl carbonate) and the product containing diethylene glycol bis (allyl carbonic acid ester) with maleic anhydride, said material containing discrete glass fibers dispersed therein in the approximate concentration range of 7% to 35%, said fibers having a diameter in the approximate range of 0.0045 inch to 0.00004 inch and a length in the approximate range of 0.01 inch to 0.25 inch.

15. A molded artificial tooth comprising completely polymerized bis [N-(carballyloxy) aminoethyl] carbonate containing discrete glass fibers dispersed therein in the approximate concentration of 10% to 25%, the dimension of said fibers being a length in the approximate range of 0.01 inch to 0.2 inch and a diameter in the approximate range of 0.00022 to 0.00048 inch.

JACOB A. SAFFIR.

(References on following page)

REFERENCES CITED

The following references are of record in the file of this patent:

UNITED STATES PATENTS

| Number | Name | Date |
|---|---|---|
| 2,136,422 | Fields | Nov. 15, 1938 |
| 2,176,837 | Ellis | Oct. 17, 1939 |
| 2,196,033 | Schuhmann | Apr. 2, 1940 |
| 2,205,488 | Merrick | June 25, 1940 |
| 2,273,891 | Pollack et al. | Feb. 24, 1942 |
| 2,279,067 | Shapiro | Apr. 7, 1942 |
| 2,314,957 | Thornton et al. | Mar. 30, 1943 |
| 2,333,513 | Berberich et al. | Nov. 2, 1943 |
| 2,339,058 | D'Alelio | Jan. 11, 1944 |

FOREIGN PATENTS

| Number | Country | Date |
|---|---|---|
| 484,343 | Great Britain | May 4, 1938 |

OTHER REFERENCES

Osborne: "Plastics in Dentistry," British Plastics, June 1944. Pages 243, 248. 18–55.1.